Dec. 15, 1959  R. E. CRAGG  2,916,988
DUPLICATING MACHINE WITH ATOMATIC CONTROLS
Filed Oct. 10, 1956  5 Sheets-Sheet 1
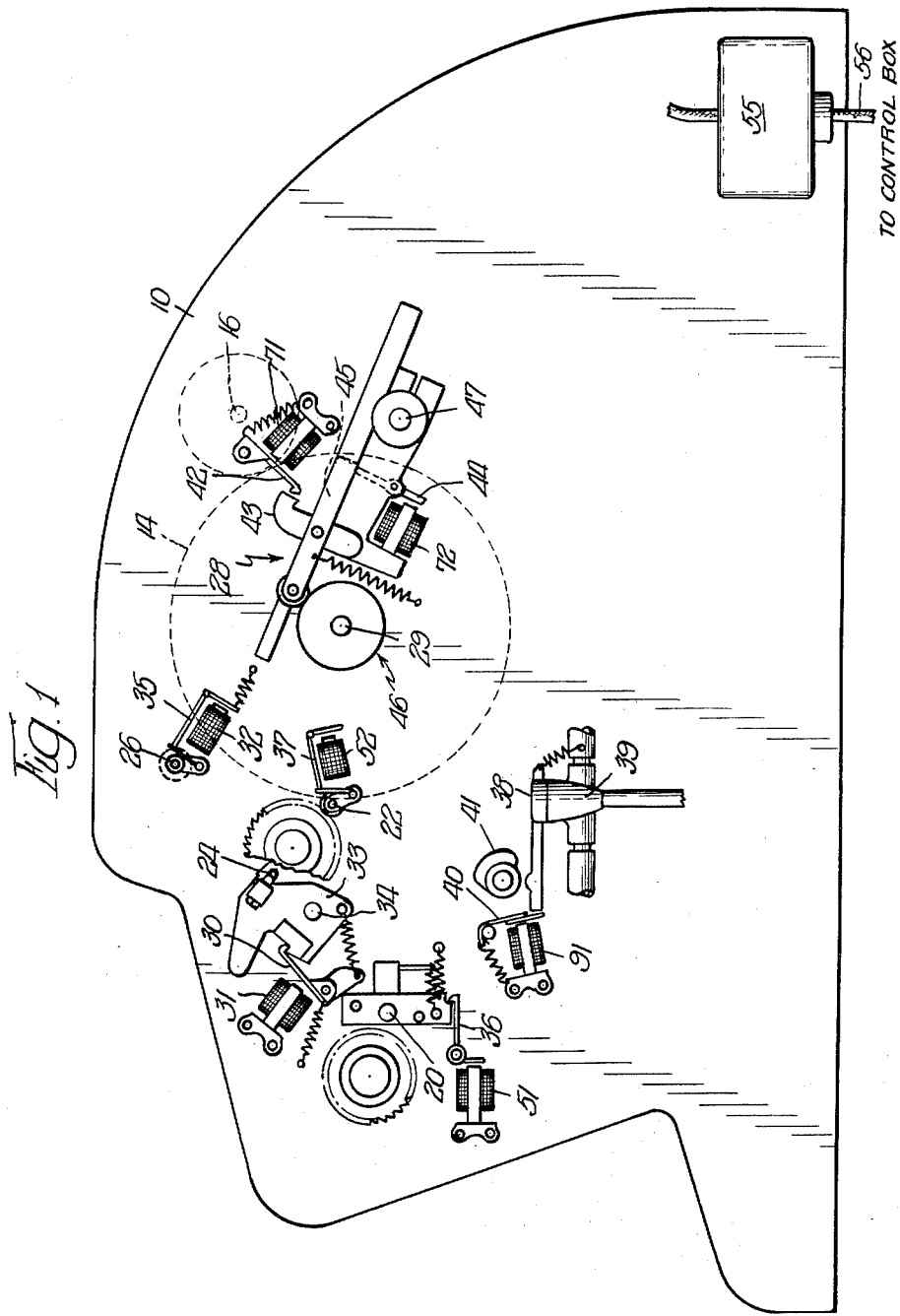
INVENTOR.
Richard E. Cragg,
BY Wilkinson, Hayley,
Byron + Hume
ATTYS Dec. 15, 1959                R. E. CRAGG                    2,916,988
             DUPLICATING MACHINE WITH ATOMATIC CONTROLS
Filed Oct. 10, 1956                                    5 Sheets-Sheet 2
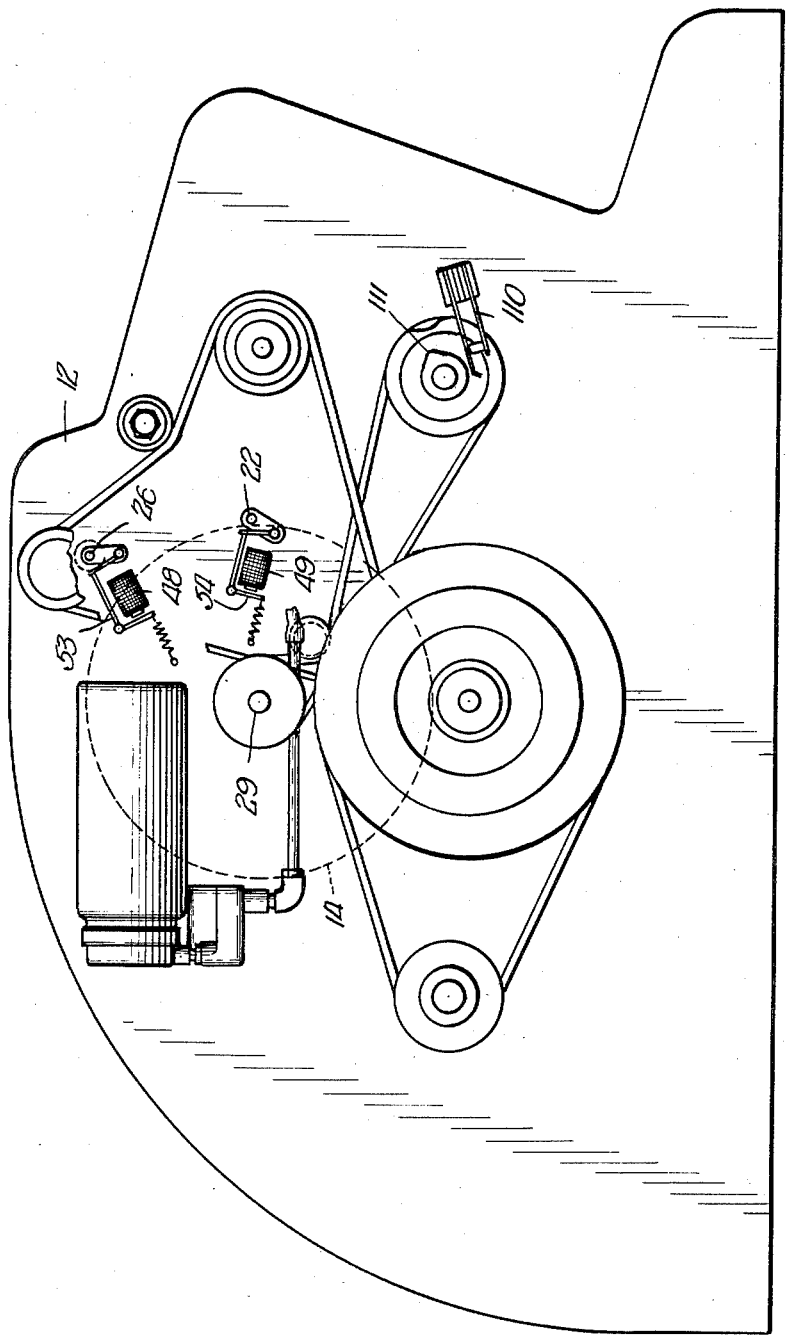
INVENTOR.
Richard E. Cragg,
BY Dec. 15, 1959  R. E. CRAGG  2,916,988
DUPLICATING MACHINE WITH ATOMATIC CONTROLS
Filed Oct. 10, 1956  5 Sheets-Sheet 3
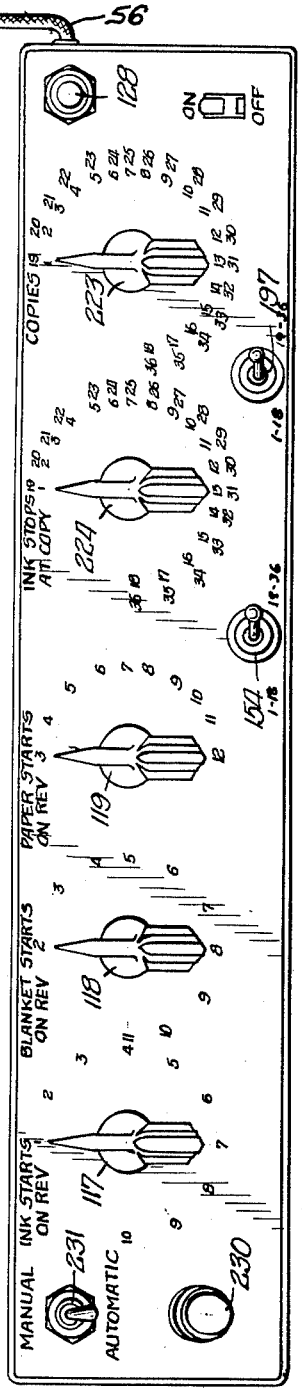
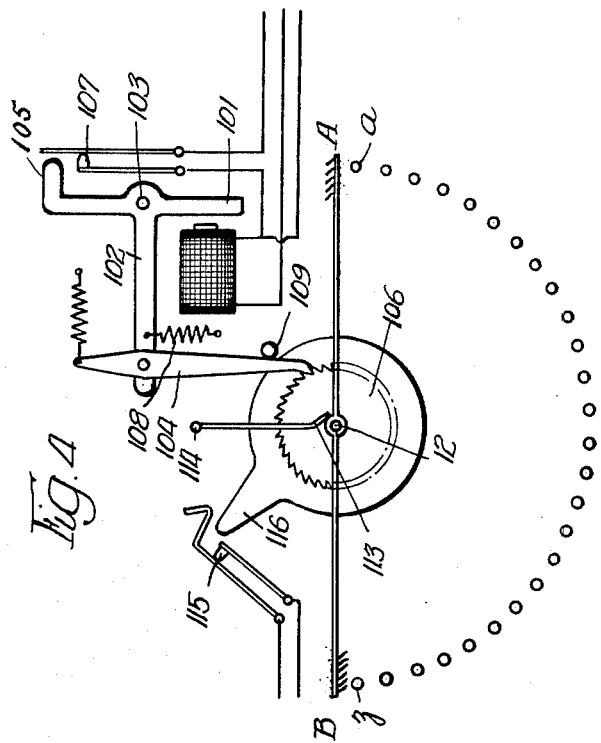
INVENTOR.
Richard E. Cragg
BY Wilkinson, Huxley,
Byron + Hume attys.

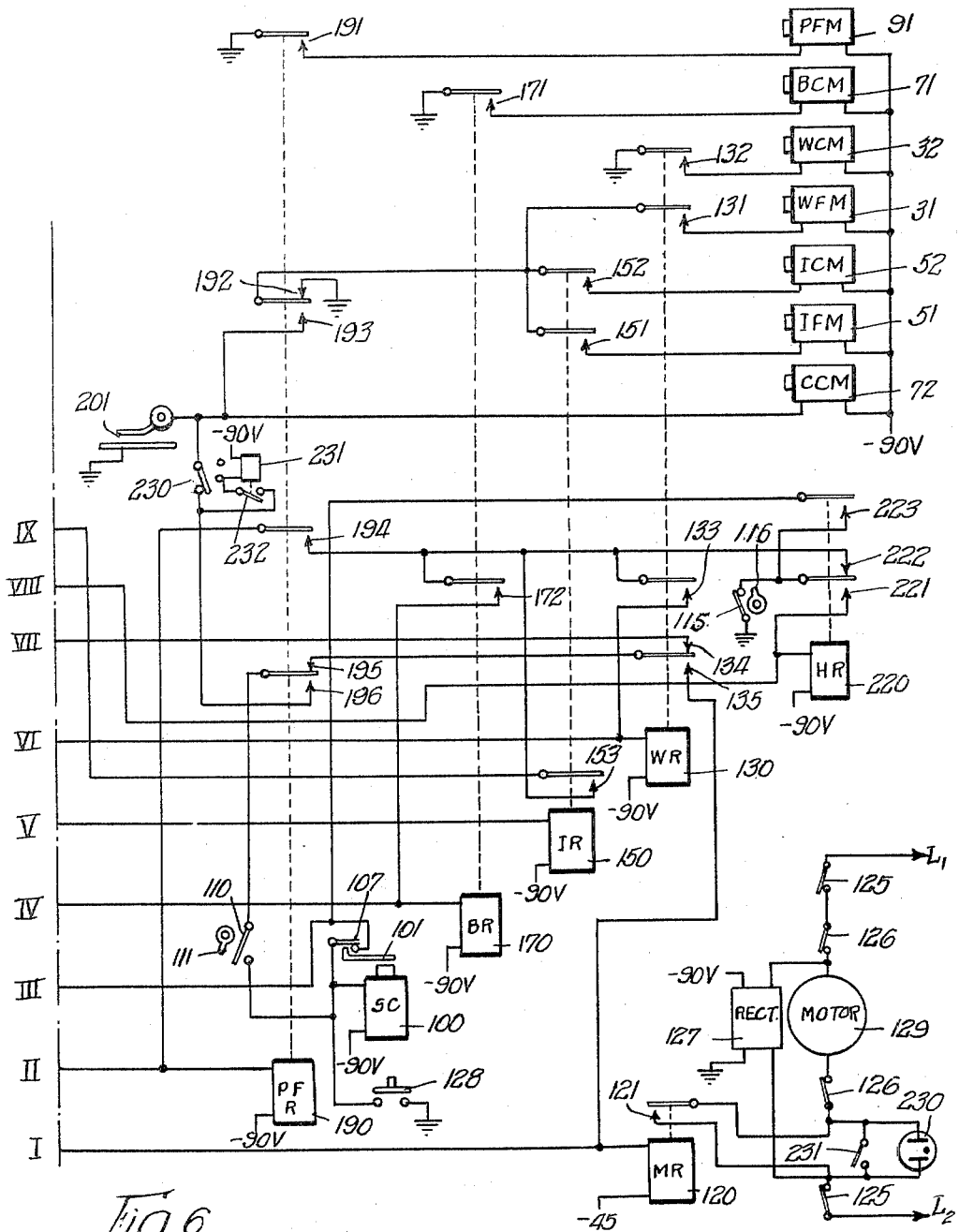

United States Patent Office 2,916,988
Patented Dec. 15, 1959

2,916,988

DUPLICATING MACHINE WITH AUTOMATIC CONTROLS

Richard E. Cragg, Wilmette, Ill., assignor to Ditto, Incorporated, a corporation of Delaware Application October 10, 1956, Serial No. 615,113

11 Claims. (Cl. 101—144)

This invention relates to duplicating machines and, more particularly, to automatic controls for machines of the offset lithographic type such as that disclosed in the United States Patent No. 2,753,795 issued to H. F. Burns on July 10, 1956.

The invention lends itself to being incorporated as an integral portion of a duplicating machine of the character disclosed in the above mentioned patent or it may be incorporated in an adapter for such a machine.

One of the principal objects of the invention is to provide an offset duplicating machine in which the control of the printing operation is substantially automatic so that a skilled duplicating machine technician is not required for its operation.

It is a further object of the invention to provide an automatic control to render operative and inoperative in a duplicating machine the moisture fountain, ink fountain, blanket roll, and paper feed mechanism.

It is a still further object of the invention to provide an automatic control that will render the ink fountain in a duplicating machine operative and inoperative at preselected times.

It is yet a further object of the invention to provide an automatic control that will render the blanket roll in a duplicating machine operative and inoperative at preselected times.

It is a still yet further object of the invention to provide an automatic control that will render the paper feed mechanism in a duplicating machine operative and inoperative at preselected times.

It is another object of the invention to provide an automatic control that will render the ink fountain, blanket roll, and paper feed mechanism in a duplicating machine operative at a preselected revolution of the main cylinder and inoperative after a preselected number of copies have been run through the machine.

Further objects and advantages of this invention will become evident as the description proceeds and from an examination of the accompanying drawings which illustrate one embodiment of the invention and in which similar numerals refer to similar parts throughout the several views.

In the drawings:

Figure 1 is a side view in elevation of one side of a duplicating machine which, while used with an adapter, will incorporate the invention, the machine being shown with the side cover plate removed.

Figure 2 is a view in elevation of the opposite side of the machine shown in Figure 1.

Figure 3 is a front view in elevation of the control box which may be plugged into the duplicating machine shown in Figures 1 and 2 to form a duplicating machine incorporating one embodiment of the invention.

Figure 4 is a somewhat diagrammatic view of one form of stepping switch which may be utilized as a component of the control box shown in Figure 3.

Figure 6 is a circuit diagram of the electrical control system in the duplicating machine shown in Figures 1 and 2 with the appropriate connection to leads from the circuit shown in Figure 1 being shown by corresponding Roman numerals.

GENERAL ORGANIZATION

Figure 5:
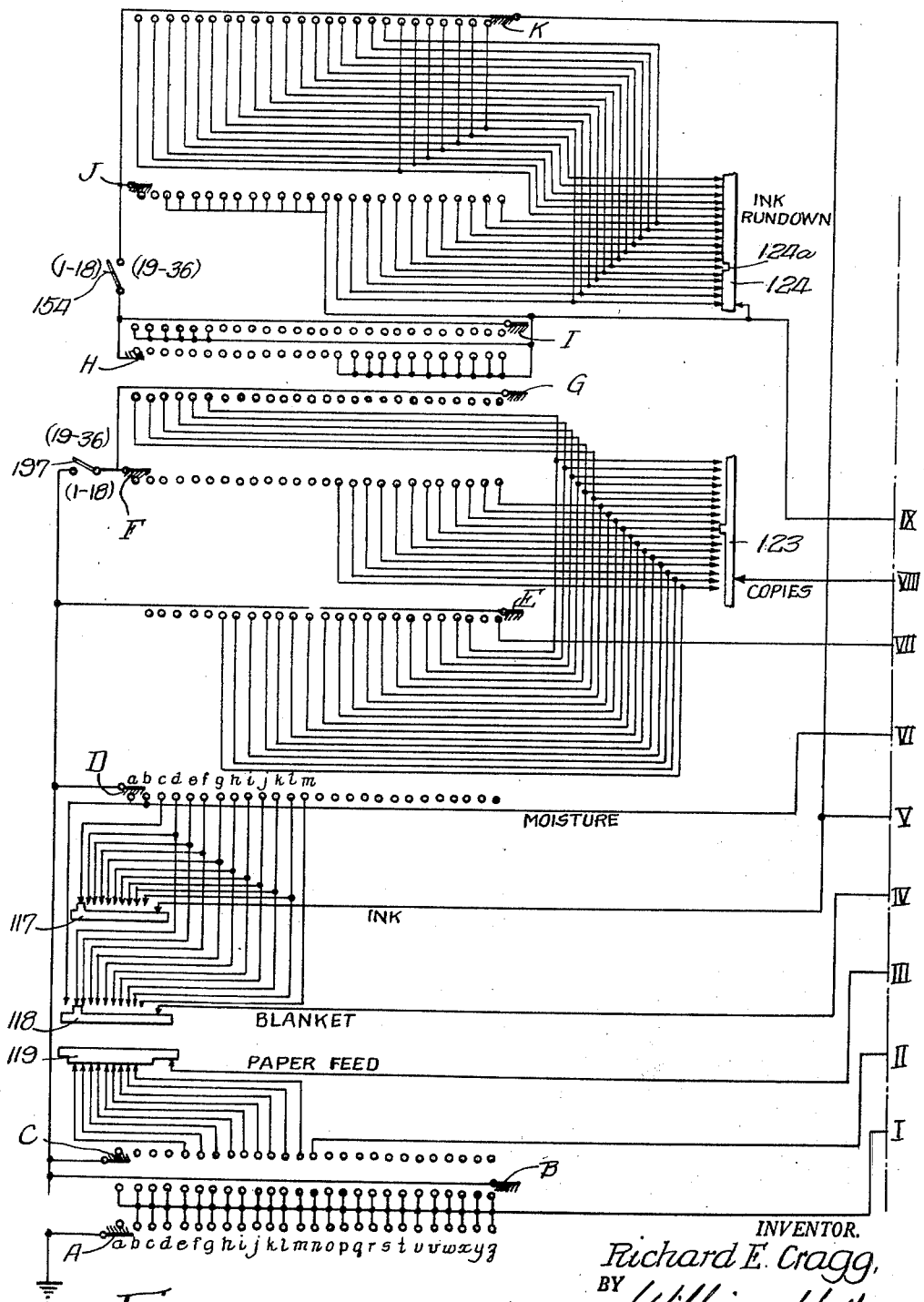
Figure 5 is a circuit diagram of the stepping switch portion of the control circuit for the duplicating machine shown in Figures 1 and 2 having the control box shown in Figure 3 properly connected thereto.

As previously stated, the duplicating machine illustrated in the drawings just described closely resembles the duplicating machine disclosed in U.S. Patent No. 2,753,795. Only the elements of the present machine which are operatively associated with the control system will be described in detail in this application.

The various sets of instrumentalities making the duplicating machine of the present invention are supported by a pair of side plates 10 and 12 which are secured in spaced relation by a plurality of tie rods (not shown). As best shown in Figure 1 in dotted lines, the main cylinder 14 of the machine is mounted for rotation between the side plates 10 and 12 and comprises a plate segment and an impression segment. The plate holding segment is adapted to carry lithographic master plates in a manner described and shown in the above mentioned U.S. Patent No. 2,753,795 and likewise, the impression segment is adapted to have sheets of paper successively clamped thereon and rotated therewith so as to have the desired material printed thereon during the operation of the machine.

Behind the main cylinder 14 and also between the side plates 10 and 12, a blanket roll 13 is journalled which roll has a rubber surface adapted to make rolling contact, first with the moistened and inked lithographic plate for the transfer of an image to the blanket roll and then, with the paper on the impression segment to transfer the image to the paper. The blanket roll and the main cylinder 14 are interconnected for rotation in unison by suitable gearing.

The machine is also provided with the conventional stack supporting feed table, a feed separator and a sheet feeder together with a sheet feed roll assembly, none of which are here shown. A valve 39 is shown in Figure 1 which controls the operation of the sheet feeder, as will be more specifically described below. An ink applying assembly is also provided, the shaft 20 of the ink feed roll being shown in Figure 1 along with the shaft 22 of the ink form roll. Both of these rolls are capable of movement into and out of operative position as will be later described.

A moisture supply means and a plate moistener assembly are also provided, the moistener feed roll shaft 24 being shown in Figure 1 along with the moisture form roll shaft 26.

In addition, the duplicating machine shown in Figures 1 and 2 has an electric motor serving as the prime mover which not only drives the various components of the machine but also operates a combined air compressor and vacuum pump of conventional design which is incorporated in a pneumatic system which serves to operate certain components in the machine.

The machine also incorporates an automatic throw-out mechanism operating in conjunction with the sheet handling mechanisms. This throw-out mechanism is of a type fully described in detail in U.S. Patent No. 2,727,461 issued December 20, 1955, to Herbert F. Bruns. Such a mechanism is adapted to be actuated by the interruption of the feeding of sheets in a machine and thereupon renders several sets of mechanisms in the machine inoperative to prevent the excessive build-up of ink and moisture and also operates to shift the blanket roll to an inoperative position. This throw-out mechanism is indicated generally in Figure 1 by the numeral 28 and is operable through cams carried by the main cylinder shaft 29. Incorporated in this mechanism is a means for independently regulating the pressure between the blanket roll and the plate segment and the blanket roll and the impression segment of the main cylinder. This in turn provides an improved handling by the machine of printing plates of various thicknesses and likewise, paper sheets of various thicknesses.

As described in Patent No. 2,753,795, a machine of the character described herein may have a control panel at the front end thereof disposed between the lower ends of the side plates upon which are mounted all of the control members for the various mechanisms in the machine. As previously stated, one of the principal objects of this invention is to provide a similar machine having a control system which will permit automatic operation after the appropriate selection has been made of the number of copies to be printed. Therefore, in a machine incorporating the invention which is the subject matter of this application (either as an integral part of the machine or as a conversion unit such as is shown in Figure 3), the conventional control panel on the machine is not used to any extent since the functions normally carried out by the controls on this panel are automatically carried out.

In the normal operation of a duplicating machine of this type, the moisture fountain, ink fountain, blanket roll and paper feed mechanisms are normally held in inoperative positions. In starting up such a machine after it has been inoperative for a substantial period, such as overnight, it is necessary to first activate the moisture fountain and moisture feed roll so that the moisture form roll can be put into proper condition to transfer moisture to the plate. Likewise, it is necessary to activate the ink fountain and ink feed roll to build up a smooth coating of ink on the ink form roll so that ink can be properly transferred to the plate. Provision is, therefore, made to first activate the moisture fountain and feed roll and the ink fountain and feed roll before the form rolls of these two mechanisms are activated. In addition, for proper operation of the machine, it is necessary to activate the moisture form roll several revolutions of the cylinder prior to the activation of the ink form roll.

Provision is, therefore, made for manual control of the inker and moistener so that they can be partially activated during the period in which the moisture build-up is made on the moisture form roll and the ink build-up is made on the ink form roll. This step having once been made during any sustained period of operation, it is no longer necessary when starting up the machine and the automatic circuit control can thereafter be utilized not including this build-up step for the form rolls.

The automatic circuit control renders each of the moisture, ink, blanket roll and paper feed mechanisms operative after a preselected number of revolutions on the main cylinder have taken place. Generally, the moisture fountain, feed and form rolls are made operative as soon as the main cylinder begins rotating so as to dampen the lithographic plate for one or more revolutions. The ink fountain, feed and form rolls are then started in operation so as to ink the plate for at least one revolution. The blanket roll is then thrown in, and is brought into association with the plate for several revolutions, although it is still moved out of contact with the impression segment of the main cylinder. After a suitable image has thus been built up on the blanket roll, the paper feed mechanism is made operative so that sheets are fed to and are carried by the impression segment of the main cylinder into rolling contact with the blanket roll and the ink image which has been built up thereon. Simultaneously, the supply of ink and moisture will be continued to the plate to replace the ink and moisture which has been transferred to the printed sheets. If the feeding of sheets is interrupted, however, the blanket roll will be moved out of association with the impression segment. It is also desirable that the supply of ink and moisture to the blanket roll, through the ink and moisture form rolls respectively, be interrupted under these circumstances. It is the general practice among most operators to stop the supply of ink a short time prior to the end of the feeding of sheets, which process is called "ink run down." This process removes the excess ink from the blanket and the plate and enables the plate to be filled without smearing.

All of this means that in an automatic control system it is necessary to have provision made for these various types of operation. The control system which is the subject of this application permits these various operations to be carried out automatically in accordance with a preselected pattern, determined principally by the number of copies which are to be printed in any one cycle.

An important feature of the type of duplicating machine in which the present invention is incorporated is the use of electromagnetic latch mechanisms. Such electromagnetic latches are utilized for the blanket roll throw-out and throw-in mechanism, the ink feed roll, the ink form roll, the moisture feed roll, the moisture form roll and the sheet feeder valve mechanism. More specifically, for example, they are used to hold the various mechanisms in their inoperative positions when a sheet is not being fed through the machine in a normal manner and to provide positive cam actuated means for shifting the mechanism to the inoperative positions so that the de-energized electromagnetic latches can be readily moved into the lock-out position. In such an arrangement these electromagnetic latches may be relatively simple and inexpensive, consuming a minimum amount of current because the power required to shift the rolls to their inoperative positions is supplied by cams driven by the main driving motor for the machine rather than through any electromagnetic means. It is through the control of the operation of these electromagnetic latch mechanisms that the machine is made completely automatic in the present invention, and that provision has been made for the various types of operation required at different time intervals in one cycle of operation, as described above.

More particularly, as shown in Figure 1, the moisture feed roll latch 30 is controlled by the electromagnet 31 so that, when the electromagnet is energized, the arm 33 is free to pivot about the stub 34 so as to move the moisture feed roll shaft 24 in and out of association with the moisture fountain. The moisture form roll latch 35 controlled by the electromagnet 32 controls the movement of the moisture form roll shaft 26. The ink feed roll latch 36 controls the movement of the ink feed roll shaft 20 and is, in turn, controlled by the electromagnet 51. The position of the ink form roll shaft 22 is controlled by the ink form roll latch 37 which is controlled by the electromagnet 52. Similarly the position of the valve arm 38 of the pneumatic paper feed control valve 39 is controlled by the latch 40, controlled in turn by the electromagnet 91. The cam 41 normally moves the valve arm 38 to the open position during one revolution thereof and if the electromagnet 91 is de-energized, the latch 40 will be moved into a position such that it will block the return of the valve arm 38 to the closed position. On the other hand, when the electromagnet 91 is energized, the arm 38 will be free to close.

The entire throw-out mechanism is adapted to be held in the thrown-out position by the latch 42 controlled by the electromagnet 71. The latch 42 is adapted to prevent the stop 43 from moving downwardly when the electromagnet is de-energized, but to permit such movement when the latter is energized. The latch 44 is likewise adapted to form a stop for an arm 45 pivoted on the throw-out mechanism, when the electromagnet 72 is de-energized, and to permit movement of the arm 45 relative to the remaining portion of the throw-out assembly when the electromagnet 72 is energized. Thus when the arm 45 is locked against pivotal movement, it can move the entire throw-out assembly, which is controlled by a plurality of cam members indicated generally by the numeral 46 carried by the cylinder shaft 29. A link assembly is operated by the shaft 47 upon which the throw-out mechanism is secured, which link assembly in turn causes appropriate movement of the blanket roll shaft 16. The exact manner in which these elements operate is fully disclosed in U.S. Patent No. 2,727,461.

As shown in Figure 2, duplicate electromagnets 48 and 49 are provided in association with side plate 12 for the control of the moisture form roll and ink form roll, latches 53 and 54 being provided for this purpose respectively.

As previously stated, the control circuit disclosed herein will energize these various electromagnets just described to render operative the moisture fountain, ink fountain, blanket roll, and paper feed mechanisms at preselected revolutions of the main cylinder in order to automatically begin the various functions at the proper time, as will be described below. The electromagnets are de-energized when a preselected number of sheets have been fed through the machine. One advantage of this control circuit is that it can be incorporated very simply into the machine disclosed in Patent No. 2,753,795 and may be used or not used as it desired. Likewise, as previously stated, such a control circuit can be made an integral part of such a machine or can take the form of a separate control unit, which is the form shown here. In the latter case, the connection between the machine and the control box may be made from the junction box 55 through the cable 56, shown in Figures 1 and 3.

Control system

Referring now to Figure 6, the circuits for energizing and de-energizing electromagnets 31, 32, 51, 52, 71, 72, and 91 are shown, with the resulting starting or stopping of the various duplicator functions.

Also the ink fountain may be rendered inoperative prior to the time the other functions are stopped by a control which may be preset for a specific number of sheets.

The magnets are controlled by a water relay 130, ink relay 150, blanket relay 170, and paper feed relay 190. Motor relay 120 is used to initiate the duplicator functions. Switch 201, which closes each time a sheet is fed into the machine, is used to control the stepping coil 100 after the paper feed has begun. All of the relays move armatures connected by dotted lines in the drawing to the close or open contacts in the various circuits, as will hereinafter be more fully described.

In order to automatically program the various functions of the duplicator, a stepping switch is employed, as illustrated in Figures 4 and 5. A plurality of wipers, A, B, C, D, E, F, G, H, I, J and K, (Figure 5) in the stepping switch are advanced one position each time, to the right as shown in the drawing, to engage a new set of contacts. As shown in Figure 5, wipers A, C, D, F, H and J are engaging home contact a in their respective rows or levels while wipers B, E, G, I, and K are 180° out of phase with the foregoing. When A, C, D, F, H, and J have advanced all the way to the right, B, E, G, I and K are about ready to start advancing from left to right. Each wiper has its own row or level of contacts a through z, referred to hereinafter by the same designation as given to the corresponding wipers. Each level has a plurality of separate contacts which may be connected in separate circuits to various relays for operating the duplicator functions. Each contact will be engaged by its wiper at a particular revolution of the main cylinder.

The wipers may be advanced by any suitable mechanism, such as the conventional stepping switch. It is preferred, however, to employ a stepping coil 100 (Figure 4) which moves the wipers each time it is de-energized, after first being energized. When an operating pulse is received by the stepping coil 100, it is energized, attracting an armature 101 to it, which through crank arm 102 pivoted at 103 pulls a pawl 104 back past a tooth on a ratchet 106. Coil 100 is in series with an interrupter switch 107 normally biased to closed position. A crank arm 102 which is pivoted about 103 when the armature 101 is attracted to coil 100, carries a finger 105 that breaks the switch 107, thus de-energizing coil 100. When the coil is de-energized, the armature is impelled by a spring 108 to its original position, thus rotating the ratchet to the next position. A stop 109 limits the travel of pawl 104. The ratchet carries wipers A, B, that are in 180° opposed pairs rotating in a clockwise direction on a shaft 114. Wiper A is adapted to sequentially engage contacts a through z. Wiper B engages another row or level of contacts. A brush 113 wipes the shaft and has a common lead 114 connected thereto. Various circuits are connected to contacts a through z as more fully explained hereinafter. Several wipers may be mounted on shaft 112 with associated rows or levels of contacts.

A homing relay 220 is employed to move the wipers to the final position before home position a, by closing a contact in the homing relay. The homing relay is held energized by a holding circuit having in series therewith a switch 115 (Figures 4 and 6). As long as homing relay 220 is energized, stepping coil 100 is rapidly energized and de-energized through the interrupter switch 107 to quickly advance the wipers. A dog 116 is mounted on the shaft of the stepping switch to cam open switch 116 when the stepping switch reaches the final position. This de-energizes the homing relay which in turn de-energizes the stepping coil to stop the homing of the wipers. The wipers are moved from final position to home a by a circuit that will be explained hereinafter.

Referring now to Figure 5, the various positions, corresponding to the separate contact points, for the wipers are designated by references numerals a through z. In the home position a none of the wipers is touching any connected contact point. It will be seen that the contacts in levels A and B are all bussed together and connected through line I to motor relay 120, except in a in level A.

Switch 110 is cammed closed each revolution of the main cylinder by a dog 111 on a shaft that turns with the main cylinder. This closes the circuit to the stepping coil 100, so that it is energized and de-energized so as to advance the wipers A through K one contact point. However, after the paper feed is begun the energization and de-energization of the stepping coil 100 is controlled by sheet detector switch 201.

Contact 222, normally closed, is in series with the holding circuits of water relay 130, ink relay 150, blanket relay 170, and paper feed relay 190. These relays are all de-energized by the opening of contact 222 when homing relay 220 is energized. Switch 115 gives a holding circuit to relay 220 through contact 221 and therefore de-energizes relay 220 when opened. Homing is accomplished via switch 115, contacts 223, 107, and coil 100 to 90v, so that the wipers are continuously advanced through the oscillations of interrupter switch 107.

Switch 115 is cammed open by a dog 116 at the last step of the stepping switch before home position a to de-energize relay 220.

Referring now to Figure 5, it will be noted that all the contacts in level A and B are bussed together and connected to line I, with the exception of contact a in level A which is not connected in any circuit. Thus, the motor relay will be energized from line I during the entire time the stepping switch is in operation, after it has been advanced to contact b.

Contact b in level D is connected by a wire VI to water relay 130. As soon as the wiper is stepped to contact b, upon initiation of the automatic control, the water relay will be energized and held energized through a holding circuit.

Selector switch 117 for the inking functions is adapted to be preset to several different positions connected to contact points c through l in level D. A common lead from the switch 117 is connected to wire V for energizing the ink relay. When wiper D reaches the contact for which ink selector switch 117 is set, the ink relay is energized, and held energized through a holding circuit.

Selector switch 118 which is for throwing in the blanket roll at a selected revolution of the main cylinder may be preset to positions corresponding to contacts b and d through m in level D. A common lead from switch 118 is connected to wire IV to energize blanket relay 170 which is then held energized through a holding circuit.

Selector switch 119 used for initiating the paper feed mechanism at a particular revolution of the main cylinder is a continuous bar adapted to connect the contacts in level C together, beginning with the contact for which the switch is first set, through contact m. A common lead from the switch is connected to wire III through interrupter switch 107 for energizing the stepping coil 100. Thus, the wipers will be advanced by the continual energization and de-energization of the stepping coil as previously described until the wipers reach position n, at which time the stepping coil will no longer be energized through wire III. Contact n is connected to paper feed relay 190 through wire II, so that when the wipers reach that position, the paper feeding will begin.

Selector switch 123 is preset to the predetermined number of copies desired to be fed through the machine. It is connected by a common lead to wire VIII to homing relay 220. When homing relay 220 is energized through switch 123, all the functions are stopped by the opening of contact 222 and the wipers are all moved to the last position. The homing is accomplished by a circuit that may be traced from ground via switch 115, contact 223, interrupter switch 107, and coil 100 to 90v. As previously described, the coil 100 and interrupter switch cause vibration of armature 101 which rapidly advances the wipers. At the last position of the stepping switch, switch 115 is cammed open to stop the homing by de-energizing relay 220.

The last contact in level E is connected by a wire VII through contacts in the water and paper feed relays to stepping coil 100. The purpose of this circuit is to advance the stepping switch from the last position to home position a after relay 220 is de-energized in order to eject the last paper from the machine. As discussed above, when the homing relay is first energized, the other relays are de-energized through opening of contact 223. Then homing starts and continues until the wipers reach the last position before home a, at which time homing relay 220 is de-energized by the opening of switch 115. Wiper E is now on the last contact z in that level and coil 100 is energized by a circuit that may be traced from ground via wiper E, contact z in level E, wire VII, contacts 134, 195, switches 110, coil 100 to 90v. This advances the wipers to home position a and the stepping coil 100 is de-energized.

Selector switch 124 is in series with the holding circuit for ink relay 150, except for contact points c through n in level J and wire IX. Switch 124 is a bar which connects together the various contacts in levels J and K to keep the relay 150 energized via wire IX. A notch 124a may be set to various positions which will open the holding circuit, thus de-energizing relay 150, thus stopping the inking functions.

Stepping switches have a limited number of contacts, so that the number of copies that may be controlled by selector switch 123 is also somewhat limited. If it is desired to stop the machine at the end of a larger number of copies than is possible with a stepping switch, a switch 230 may be installed in the line between the sheet detector switch 201 and contact 196 of the paper feed relay. Switch 230 may have three positions. In the left position as shown in Figure 6 of the drawing, sheet detector switch 201 is connected directly to contact 196 of the paper feed relay.

In the extreme right position switch 230 opens the circuit between the sheet detector switch 201 and contact 196, since in this position switch 230 is not connected to any other circuit. The result of opening the circuit is to prevent the energization and de-energization of the stepping coil 100 as the sheets are fed into the machine. Consequently the stepping switch is not advanced and the feeding of paper may continue indefinitely. In other words, for continuous operation of the duplicator, the switch 230 is moved to the extreme right position which breaks the circuit to the stepping coil.

In the middle position switch 230 energizes the counter coil 231 of a well known type of counter each time a sheet is fed, by the circuit which may be traced from ground through sheet detector switch 201, which is closed when a sheet is fed, switch 230, counter coil 231 to 90 volts. Each time a sheet is fed through the machine, sheet detector switch 201 is closed, and the counter coil is energized. Also in the middle position a contact 232, normally open, operated by the counter coil 231, is connected in series with the circuit for the stepping coil 100. Since the contact 232 is normally open, the stepping coil remains de-energized until contact 232 is closed. Counter coil 231 may be preset to close contact 232 after being energized a predetermined number of times. After the preset number of energizations has been reached, contact 232 will be closed by means not shown, so as to again energize the stepping coil and advance the wipers. The foregoing circuit may be employed for obtaining the programming of the duplicator functions over additional periods of time.

*Operation*

To operate the duplicating machine by the automatic control, switches 125 and 126 in the lines $L_1$, $L_2$, to a 110 volt A.C. source are closed, energizing rectifier 127 which supplies 90 volts used to operate the various relays and coils. When start button 128 is depressed, stepping coil 100 is energized. When button 128 is released, coil 100 is deenergized which steps wipers A through K ahead to position b.

In position b, motor relay 120 is energized through a circuit from 90v through the relay 120, line I, the wipers and contacts in levels A and B, which are connected together to ground. Contact 121 is now closed which operates motor 129.

In every position except the initial position a motor relay 120 will be energized via wipers A and B and their contact rows. The motor 129 runs while relay 120 is energized.

Also in position b water relay 130 is energized through a circuit which may be traced from 90v through the relay, line VI, contact b, wiper D to ground. Relay 130 is held energized by a holding circuit from ground through switch 115 and contacts 222, 133 to coil 130 and 90 volts. Relay 130 in turn energizes water magnets 31 and 32 via contacts 131, 192, and 132 respectively.

With the duplicator revolving, auxiliary contact 110 will close and open each revolution by the cam action of dog 111. This energizes and de-energizes stepping coil 100 from 90v through coil 100, switch 110, contacts 195, 135, wire I, and wipers A, B. All wipers advance one step each time contact 110 opens and the stepping coil 100 is de-energized.

When wiper D reaches that contact for which ink selector switch 117 is set, ink relay 150 will energize, starting the duplicator ink functions, through a circuit that may be traced from 90v, coil 150, wire V, switch 117, and wiper D. Relay 150 is held energized from ground via switch 115, contacts 222, 153, wire IX, switch 124, wipers K, J, H, I, wire V, through relay coil 150 to 90v (as will be described later). The ink magnets 51, 52, are now energized by a circuit from ground through contact 192, the respective contacts 151, 152, and the respective coils of magnets 51, 52 to 90v.

When wiper D reaches that contact for which blanket roll selector switch 118 is set, relay 170 will energize, closing contact 171, and energizing magnet 71, causing the duplicator blanket to contact the plate. The circuit for energizing relay 170 is from 90v through the coil for relay 170, wire IV, switch 118, and wiper D to ground. Relay 170 is held energized from ground via switch 115 and contacts 222, 172, through the coil of 170 to 90v.

When wiper C reaches that contact which is first connected to switch 119, all wipers home to position n due to the energization of stepping coil 100 from ground via wiper C, switch 119, wire III, interrupter switch 107, through coil 100 to 90v. At position n, relay 190 is energized from ground through wiper C and wire II. As relay 190 is energized, it closes contact 191. This energizes magnet 91 and feeding of paper starts.

Further stepping of the wipers and energizing of ink magnets 51 and 52, water magnet 31 and copy contact magnet 72 is now controlled by the opening or closing of sheet detector contact 201.

Relay 190 is held energized from ground via switch 115, contacts 222, 194, coil 190 to 90v. With the opening of contact 192 by energizing of relay 190, magnets 31, 52, and 51 are de-energized causing their respective water and ink functions to stop. Switch 201 remains open at all times unless a sheet of paper is fed, at which time it closes momentarily by means not shown. When switch 201 closes, magnets 31, 52 and 51 are energized from ground via switch 201, contact 193, and contacts 131, 152 and 151 respectively. This restores the ink and water functions for each sheet fed as controlled by these magnets. Magnet 72 is also energized through switch 201, throwing in the blanket roll onto the plate segment of the main cylinder for printing.

Since contact 195 is now open, stepping coil 100 can no longer be energized through auxiliary switch 110 as before. Instead, stepping coil 100 energizes and de-energizes each time a sheet is fed by the operation of switch 201. When a sheet is fed and switch 201 is closed, stepping coil 100 is energized from ground via switches 201, 230, contact 196, switch 110 through the coil 100 to 90v. Therefore, all wipers will advance one position for each sheet of paper fed, but will remain stationary when paper is not fed, thus assuring a correct copy count.

If less than 19 copies are desired, switch 197 (Figures 3 and 5) is closed. This puts power on wipers F and G so that when one or the other wiper reaches that contact on contact level F or G for which switch 123 is set, homing relay 220 will be energized, and will be held energized from ground through switch 115, contact 221, and through the coil of 220 to 90v. With the opening of contact 222 in the homing relay 220 at the desired number of copies, paper feed relay 190, water relay 130, ink relay 150, and blanket relay 170 will be de-energized with the consequent stopping of the duplicator functions, since contact 222 is in series with holding circuits of these respective relays. Homing of the wipers is now started by the closing of contact 223 which applies power to interrupter switch 107 from ground via switch 115, contact 223, switch 107, and coil 100 to 90v. When the wipers reach the last step of the stepping switch before home position, switch 115 is cammed open by a cam 116 mounted on the shaft of the stepping switch. This breaks the homing circuit and the homing relay holding circuit so that the wipers stop this last position before home a.

If 19 to 36 copies are desired, switch 197 (Figures 3 and 5) will be opened. This disconnects power from wipers F and G so that relay 220 cannot be energized until copy 19 or after. When wiper E reaches that contact on level E for which switch 123 is set, homing relay 220 will be energized with the same results as described above.

If ink rundown is desired commencing somewhere from copy 1 through 18, switch 154 (Figures 3 and 5) will be opened. Holding current for ink relay 150 is from ground via switch 115, contacts 222, 153, wire IX, switch 124, and wiper J or wiper K (with the exception that from position c through n of wiper J, the switch 124 is bypassed), wire V, coil of 150 to 90v. If gap 124a of switch 124 is set anywhere from 1 to 18, when wiper J reaches that contact for which switch 124 is set, gap 124a breaks the holding circuit, de-energizing relay 150 and stopping all ink functions in the duplicator.

If ink rundown is desired commencing some time after copy 18, switch 154 is left closed. While the wipers are advancing from m of wiper H to f of wipers I and K, the holding circuit for relay 150 by-passes switch 124 by going through from ground via switch 115, contacts 222, 153, wire IX, strapped contacts c through n of level J, strapped contacts m through f, of contact levels H and I respectively, wipers J, H, and I, switch 154, wire V through coil 150 to 90v. From position g of levels KI on, the holding circuit goes through from ground via switch 115, contacts 222, 153, switch 124, wiper K, wire V, coil 150 to 90v. When wiper K reaches that contact for which gap 124(a) of switch 124 is set, the current is broken and ink rundown begins as described previously.

Now let us assume that it is desired to operate the duplicator manually. If neon light 230 is on, we know that switch 126 is closed, and if switch 231 is closed, motor 129 will start. Switch 126 should be opened darkening light 230, after which switch 231 may be closed. Now the duplicator is ready to be operated manually by means not shown, starting with the closing of switch 126.

In the drawing and specification there has been set forth a preferred embodiment of the invention and although specific terms are employed, these are used in a generic and descriptive sense only, and not for purposes of limitation. Changes in form and the proportion of parts, as well as the substitution of equivalents are contemplated. Specifically and by way of example, it is contemplated that a mechanical system of cams and gears can be substituted for the electrical system including the stepping switches and electromagnets performing the control operations and that electronic counters may be substituted for the switches. It is meant to cover in the appended claims these and other modifications, changes and variations as fall within the true spirit and scope of the invention.

I claim:

1. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition; the combination comprising, a count device functioning in timed relation to the main cylinder, switch means for recording the count from said count device, means responsive to the initial operation of said count device for operating said moisture fountain into said operative position, ink fountain control means responsive to a preselected count recorded in said switch means for operating said ink fountain into said operative position, blanket roll control means responsive to a preselected count recorded in said switch means for operating said blanket roll into said throw-in position, paper feed control means responsive to a preselected count recorded in said switch means greater than said blanket roll preselected count for operating said paper feed mechanism into said operative condition, means responsive to operation of said paper feed mechanism into said operative condition for rendering said moisture fountain and said ink fountain inoperative during intervals when paper is not being fed by said mechanism, ink rundown control means responsive to a preselected count recorded in said switch means greater than said paper feed preselected count for restoring said ink fountain to said normal position, and restoring means responsive to a preselected count recorded in said switch means greater than said ink rundown preselected count for restoring the foregoing operated devices to said normal position and for restoring said paper feed mechanism to said normal condition.

2. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition; the combination comprising, a count device functioning in timed relation to the main cylinder, switch means for recording the count from said count device, means responsive to the initial operation of said count device for operating said moisture fountain into said operative position, ink fountain control means responsive to a preselected count recorded in said switch means for operating said ink fountain into said operative opsition, blanket roll control means responsive to a preselected count recorded in said switch means for operating said blanket roll into said throw-in position, paper feed control means responsive to a preselected count recorded in said switch means greater than said blanket roll preselected count for operating said paper feed mechanism into said operative condition, and restoring means responsive to a preselected count recorded in said switch means greater than said paper feed preselected count for restoring said foregoing operated devices to said normal position and for restoring said paper feed mechanism to said normal condition.

3. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition; the combination comprising, a count device functioning in timed relation to the main cylinder, switch means for recording the count from said count device, ink fountain control means responsive to a preselected count recorded in said switch means for operating said ink fountain into said operative position, paper feed control means responsive to a preselected count recorded in said switch means greater than said ink fountain preselected count for operating said paper feed mechanism into said operative condition, means responsive to operation of said paper feed mechanism into said operative condition for rendering said ink fountain inoperatve during intervals when paper is not being fed by said mechanism, ink rundown control means responsive to a preselected count recorded in said switch means greater than said paper feed preselected count for restoring said ink fountain to said normal position, and restoring means including a counter responsive to a preselected count recorded in said switch means greater than said ink rundown count for restoring said paper feed mechanism to said normal condition.

4. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition; the combination comprising, a count device functioning in timed relation to the main cylinder, switch means for recording the count from said count device, ink fountain control means responsive to a preselected count for operating said ink fountain into said operative position, paper feed control means including a counter responsive to a preselected count recorded in said switch means greater than said ink fountain preselected count for operating said paper feed mechanism into said operative condition, ink rundown control means responsive to a preselected count recorded in said switch means greater than said paper feed preselected count for restoring said ink fountain to said normal position, and restoring means responsive to a preselected count recorded in said switch means greater than said ink rundown preselected count for restoring said paper feed mechanism to said normal condition and said ink fountain means to said normal position.

5. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition; the combination comprising, a count device functioning in timed relation to the main cylinder, switch means for recording the count from said count device, ink fountain control means responsive to a preselected count recorded in said switch means for operating said ink fountain into said operative position, blanket roll control means responsive to a preselected count recorded in said switch means for operating said blanket roll into said throw-in position, ink rundown control means responsive to a preselected count recorded in said switch means greater than said blanket roll preselected count for restoring said ink fountain to said normal position, and restoring means responsive to a preselected count recorded in said switch means greater than said ink rundown preselected count for restoring said blanket roll to said normal condition.

6. In an offset duplicating machine including a main cylinder and provided with a moisture fountain and an ink fountain each including a movable form roll and provided with a blanket roll operative between a normal position and a throw-in position and provided with a paper feed mechanism operative between a normal condition and an operative condition; the combination comprising, a count device functioning in timed relation to the main cylinder, switch means for recording the count from said count device, ink fountain form roll latch means operative in a first position for holding said form roll away from the main cylinder and operative into a second position for engaging the form roll to the main cylinder, an ink fountain electromagnet de-energized for operating said corresponding latch means in said first position and energized for operating said latch means into said second position, ink fountain control means including a count selector switch responsive to a preselected count recorded in said switch means for energizing said normally de-energized ink fountain electromagnet, blanket roll latch means operative in a first position for holding said blanket roll out of contact with the main cylinder and operative into a second position for engaging the blanket roll to the main cylinder, a blanket roll electromagnet de-energized for operating the corresponding latch means into said first position and energized for operating said corresponding latch means into said second position, blanket roll control means including a count selector switch responsive to a preselected count recorded in said switch means for energizing said normally de-energized blanket roll electromagnet, and ink rundown control means including a count selector switch responsive to a preselected count recorded in said switch means for de-energizing said energized ink fountain electromagnet.

7. In an offset duplicating machine including a main cylinder and provided with a moisture fountain and an ink fountain each including a movable form roll and provided with a blanket roll operative between a normal position and a throw-in position and provided with a paper feed mechanism operative between a normal condition and an operative condition; the combination comprising, a count device functioning in timed relation to the main cylinder, switch means for recording the count from said count device, moisture fountain form roll latching means operative in a first position for holding said form roll away from the main cylinder and operative into a second position for engaging said form roll to the main cylinder, a moisture fountain electromagnet de-energized for operating said latching means into said first position and energized for operating said latching means into said second position, means responsive to the operation of said count device for energizing said moisture fountain electromagnet, ink fountain form roll latch means operative in a first position for holding said form roll away from the main cylinder and operative into a second position for engaging the form roll to the main cylinder, an ink fountain electromagnet de-energized for operating said corresponding latch means in said first position and energized for operating said latch means into said second position, ink fountain control means including a count selector switch responsive to a preselected count recorded in said switch means for energizing said normally de-energized ink fountain electromagnet, blanket roll latch means operative in a first position for holding said blanket roll out of contact with the main cylinder and operative into a second position for engaging the blanket roll to the main cylinder, a blanket roll electromagnet de-energized for operating the corresponding latch means into said first position and energized for operating said corresponding latch means into said second position, blanket roll control means including a count selector switch responsive to a preselected count recorded in said switch means for energizing said normally de-energized blanket roll electromagnet, a paper feed electromagnet de-energized for operating said paper feed mechanism into said normal condition and energized for operating said paper feed mechanism into said operative condition, paper mechanism control means including a count selector switch responsive to a preselected count recorded in said switch means greater than said blanket roll preselected count for energizing said normally de-energized paper feed electromagnet, and restoring control means including a count selector switch responsive to a preselected count recorded in said switch means greater than said paper mechanism preselected count for de-energizing the electromagnet means of said moisture fountain and ink fountain and blanket roll and paper feed mechanism.

8. In an offset duplicating machine including a main cylinder and provided with a moisture fountain and an ink fountain each including a movable form roll and provided with a paper feed mechanism operative between a normal condition and an operative condition; the combination comprising, a count device functioning in timed relation to the main cylinder, switch means for recording the count from said count device, moisture fountain form roll latching means operative in a first position for holding said form roll away from the main cylinder and operative into a second position for engaging said form roll to the main cylinder, a moisture fountain electromagnet de-energized for operating said latching means into said first position and energized for operating said latching means into said second position, means responsive to the operation of said count device for energizing said moisture fountain electromagnet, ink fountain form roll latch means operative in a first position for holding said form roll away from the main cylinder and operative into a second position for engaging the form roll to the main cylinder, an ink fountain electromagnet de-energized for operating said corresponding latch means in said first position and energized for operating said latch means into said second position, ink fountain control means including a count selector switch responsive to a preselected count recorded in said switch means for energizing said normally de-energized ink fountain electromagnet, a paper feed electromagnet de-energized for operating said paper feed mechanism into said normal condition and energized for operating said paper feed mechanism into said operative condition, paper mechanism control means including a count selector switch responsive to a preselected count recorded in said switch means greater than said ink fountain preselected count for energizing said normally de-energized paper feed electromagnet, and restoring control means including a count selector switch responsive to a preselected count recorded in said switch means greater than said paper mechanism preselected count for de-energizing said ink fountain and paper feed electromagnets.

9. In an offset duplicating machine including a main cylinder and provided with a blanket roll operative between a normal position and a throw-in position and provided with a paper feed mechanism operative between a normal condition and an operative condition; the combination comprising, a count device functioning in timed relation to the main cylinder, switch means for recording the count from said count device, blanket roll latch means operative in a first position for holding said blanket roll out of contact with the main cylinder and operative into a second position for engaging the blanket roll to the main cylinder, a blanket roll electromagnet de-energized for operating the corresponding latch means into said first position and energized for operating said corresponding latch means into said second position, blanket roll control means including a count selector switch responsive to a preselected count recorded in said switch means for energizing said normally de-energized blanket roll electromagnet, a paper feed electromagnet de-energized for operating said paper feed mechanism into said normal condition and energized for operating said paper feed mechanism into said operative condition, paper mechanism control means including a count selector responsive to a preselected count recorded in said switch means greater than said blanket roll preselected count for energizing said normally de-energized paper feed electromagnet and restoring control means including a count selector switch responsive to a preselected count recorded in said switch means greater than said paper mechanism preselected count for de-energizing said blanket roll electromagnet and said paper feed electromagnet.

10. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition, the combination comprising, a count device functioning in timed relation to the main cylinder, switch means for recording the count from said count device, means responsive to the operation of said count device for operating said moisture fountain into said operative position, ink fountain control means including a count selector switch responsive to a first preselected count recorded in said switch means for operating said ink fountain into said operative position, blanket roll control means including a count selector switch responsive to a second preselected count recorded in said switch means for operating said blanket roll into said throw-in position, paper feed control means including a count selector switch responsive to a third preselected count recorded in said switch means for operating said paper feed mechanism into said operative condition, means responsive to operation of said paper feed mechanism into said operative condition for rendering said moisture fountain and said ink fountain inoperative during intervals when paper is not being fed by said mechanism, ink rundown control means including a counter and count selector switch responsive to a fourth preselected count recorded in said switch means greater than the third count for restoring said ink fountain to said normal position, and restoring means including a count selector switch responsive to a fifth preselected count recorded in said switch means greater than said fourth count for restoring said moisture fountain and said blanket roll to said normal position and for restoring said paper feed mechanism to said normal condition and for rendering said count device inoperative and for clearing said switch means.

11. In an offset duplicating machine including a main cylinder and provided with a moisture fountain and an ink fountain each operative between a normal position and an operative position and a blanket roll operative between a normal position and a throw-in position and a paper feed mechanism operative between a normal condition and an operative condition, the combination comprising, a count device functioning in timed relation to the main cylinder, switch means for recording the count from said count device, means responsive to the operation of said count device for operating said moisture fountain into said operative position, ink fountain control means including a count selector switch responsive to a first preselected count recorded in said switch means for operating said ink fountain into said operative position, blanket roll control means including a count selector switch responsive to a second preselected count recorded in said switch means for operating said blanket roll into said throw-in position, paper feed control means including a count selector switch responsive to a third preselected count recorded in said switch means for operating said paper feed mechanism into said operative condition, means responsive to the operation of said paper feed mechanism for rendering said count device and said moisture fountain and said ink fountain operative only in response to each feed of a sheet of paper by said mechanism, ink rundown control means including a count selector switch responsive to a fourth preselected count recorded in said switch means greater than said third count for restoring said ink fountain to said normal position, and restoring means including a count selector switch responsive to a fifth preselected count recorded in said switch means greater than said fourth count for restoring said moisture fountain and said blanket roll to said normal position and for restoring said paper feed mechanism to said normal condition and for rendering said count device inoperative and for clearing said switch means.

References Cited in the file of this patent
UNITED STATES PATENTS

| 2,753,795 | Bruns | July 10, 1956 |
| 2,756,672 | George | July 31, 1956 |

UNITED STATES PATENT OFFICE

CERTIFICATE OF CORRECTION

Patent No. 2,916,988                      December 15, 1959

Richard E. Cragg

It is hereby certified that error appears in the printed specification of the above numbered patent requiring correction and that the said Letters Patent should read as corrected below.

Column 1, line 18, for "H. F. Burns" read -- H. F. Bruns --; column 5, line 27, for "it desired" read -- is desired --; column 6, line 2, for "When 2an" read -- When an --; column 14, line 32, after "selector" insert -- switch --.

Signed and sealed this 24th day of May 1960.

(SEAL)
Attest:

KARL H. AXLINE                      ROBERT C. WATSON
Attesting Officer                 Commissioner of Patents